(12) United States Patent
Fenner et al.

(10) Patent No.: US 6,264,807 B1
(45) Date of Patent: Jul. 24, 2001

(54) CERAMIC OXYGEN GENERATION SYSTEM

(75) Inventors: Jerold E. Fenner, Hill AFB, UT (US); Nathan A. Dillon; Ming-Shih Wong, both of San Antonio, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/435,676

(22) Filed: Nov. 8, 1999

(51) Int. Cl.[7] ................................................. C25B 9/00
(52) U.S. Cl. .......................... 204/252; 204/265; 204/266; 204/278.5
(58) Field of Search ................................ 204/265, 266, 204/242, 252, 278.5; 205/634, 636, 545, 538, 542

(56) References Cited

U.S. PATENT DOCUMENTS 4,344,832 * 8/1982 Dahlberg ............................ 204/266
5,332,483 * 7/1994 Gordon ............................... 204/265
5,582,710 * 12/1996 Mairesse et al. ..................... 205/634

* cited by examiner

*Primary Examiner*—Bruce F. Bell
(74) *Attorney, Agent, or Firm*—Tony Y. Cole; Bobby D. Scearce; Thomas L. Kundert

(57) ABSTRACT

A oxygen generation system comprising a plurality of cells arranged in a stack. Each cell is comprised of a BICUVOX electrolyte and a pair of Inconel® electrodes placed in electrical contact with the BICUVOX electrolyte to produce a flow of oxygen therethrough. The BICUVOX electrolyte is comprised of a square thin plate. The electrodes are plates having the same dimensions as the electrolyte. The electrode plates are machined with gas flow channels oriented to separate high purity oxygen gas flow from oxygen-depleted gas flow. The stack is enclosed in a tubular manifold composed of magnesium oxide and has a diameter slightly larger than the diagonal length of the electrolyte and electrode plates. The stack is sealed at its four corners to the inside surface of the manifold creating four separate passages for flow of oxygen-containing gas, high purity oxygen gas, and oxygen-depleted gas.

9 Claims, 3 Drawing Sheets

CERAMIC OXYGEN GENERATION SYSTEM

RIGHTS OF THE GOVERNMENT

The invention described herein may be manufactured and used by or for the Government of the United States for all governmental purposes without the payment of any royalty.

FIELD OF THE INVENTION

The present invention relates generally to ceramic oxygen generating systems and more particularly, to a novel oxygen generation system which uses a new ceramic ionic conducting material, known as copper-doped bismuth vanadate, or BICUVOX as an electrolyte.

BACKGROUND OF THE INVENTION

All ceramic oxygen-generating systems work in accordance with the same basic working principle. The ceramic electrolyte is bounded on either side by an electrode, that is, a cathode on one side (the air side) and anode on the other (the oxygen side). The ceramic electrolyte is preferably fabricated into a thin membrane in order to enhance oxygen flux and reduce internal resistance. Upon applying voltage across the electrolyte/electrode assembly oxygen molecules in the air side of the system are first ionized at the cathode/electrolyte interface ($O_2 + 4e^- \rightarrow 2O^{2-}$). The negatively charged oxygen ions, driven by the potential gradient, then diffuse through the electrolyte via a large number of existing vacancies. At the opposite anode/electrolyte interface, oxygen molecules are reformed after releasing electrons ($2O^{2-} \rightarrow O_2 + 4e^{31}$). Since the ceramic electrolyte permits only $O^{2-}$ diffusion, pure oxygen is therefore generated on the oxygen side of the system.

Prior art ceramic oxygen generating systems typically use stabilized zirconia or ceria as an electrolyte material. Unfortunately, these ceramic oxygen-ion-conducting materials require a high temperature, in excess of 800° C., in order to achieve satisfactory conductivity. The need therefore exists for a cost-effective materials system for ceramic oxygen generating applications at lower operating temperatures (below 800° C.).

Recently, a new group of low-temperature ceramic ionic conductors has emerged, based on bismuth vanadate doped with metal cations. The highest conductivity has been exhibited by copper-doped bismuth vanadate, known by the generic name BICUVOX. BICUVOX generally has the following formula: $Bi_2V_{0.9}Cu_{0.1}O_{5.35}$.

BICUVOX has high potential for use in ceramic oxygen generating systems operating at temperatures below 600° C. One of the most significant benefits associated with the lowered working temperature is the availability of low-cost, machinable metals for use as electrodes.

SUMMARY OF THE INVENTION

In accordance with the foregoing background and unresolved needs, the system of the present invention is provided for oxygen generation applications at temperatures below 600° C.

In a first embodiment, an oxygen generation system is provided which comprises a pair of Inconel® electrodes placed in electrical contact with a BICUVOX electrolyte so as to produce a flow of oxygen ions there through. BICUVOX possesses superior oxygen mobility at the targeted working temperature. Inconel® is an inexpensive, machinable metal with similar thermal expansion behavior to that of BICUVOX. Gas flow channels are machined on the sides of the Inconel® electrodes. These gas flow channels are oriented so that oxygen gas flow and oxygen-depleted gas flow may be separated.

In a second embodiment, a plurality of electrolyte/electrode cells is arranged to form a stack of cells. Each BICUVOX electrolyte is comprised of a thin flat plate which is square in shape. The Inconel® electrodes are comprised of square plates having the same lengths and widths as the BICUVOX electrolytes. The electrode plates are machined with gas flow channels which are oriented so that oxygen flow and oxygen-depleted gas flow may be separated. A thin layer of gold paste is applied at each electrolyte/electrode interface. Electrical leads are attached to the electrodes. The stack of cells is enclosed in a tubular manifold which is composed of magnesium oxide and which has a diameter which is slightly larger than the diagonal length of the electrolyte and electrode plates. The stack is sealed at its four corners to the inside surface of the manifold, thereby creating four separate passages for flow of oxygen-containing gas, high purity oxygen gas, and oxygen-depleted gas. The tubular manifold is capped on the top and bottom with circular disks composed of Inconel®. Gas inlet and outlet tubes within the top cap supply oxygen containing gas to the system and remove oxygen gas and oxygen-depleted gas from the system. In operation, electrical power is supplied to the system through the lead wires. A source of oxygen-containing gas is supplied to the system through the inlet tube. Oxygen molecules are ionized at the cathode/electrolyte interface and reformed at the anode/electrolyte interface. High purity oxygen gas is collected from oxygen outlet tubes. Oxygen-depleted gas is released through another outlet tube.

BRIEF DESCRIPTION OF THE DRAWINGS

The invention will be clearly understood from the following detailed description of preferred embodiments thereof read in conjunction with the accompanying drawing wherein.

DETAILED DESCRIPTION OF THE INVENTION

Figure 1:
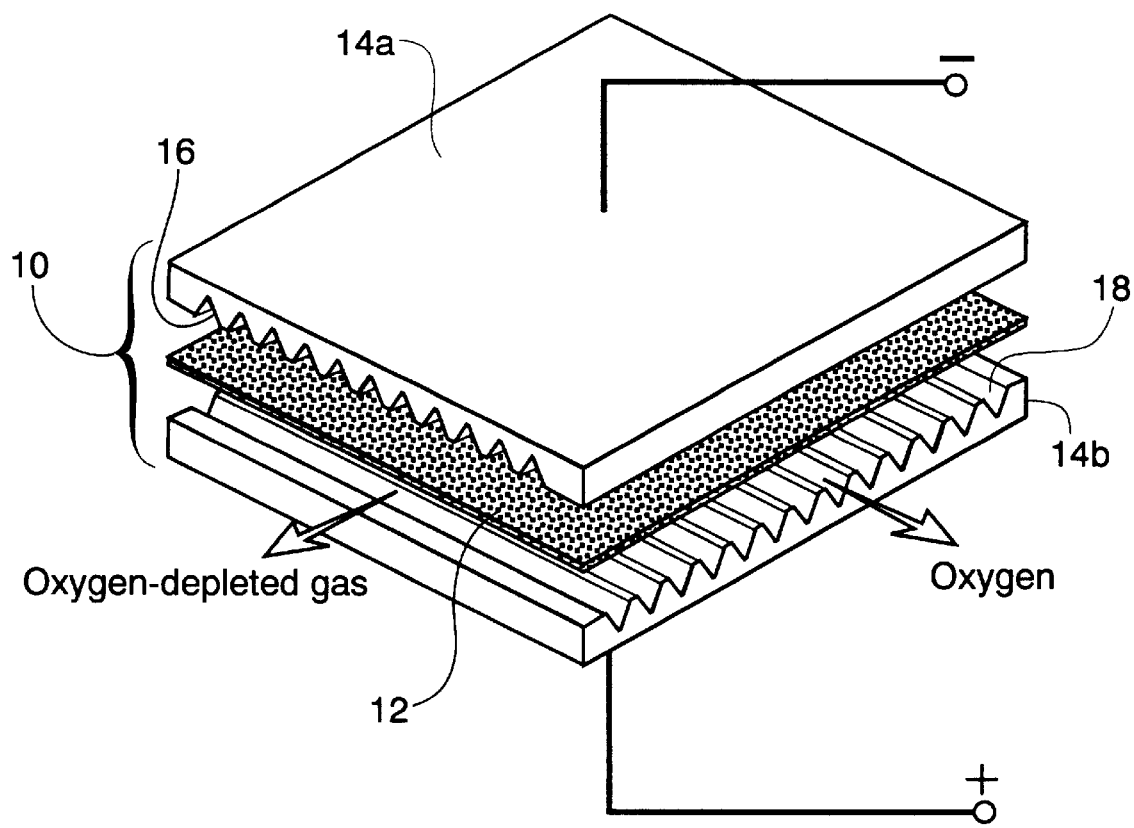
FIG. 1 is a schematic view of the essential components of a representative oxygen generating system of the invention.

An oxygen generation system 10 in accordance with the present invention is illustrated at FIG. 1. Oxygen generation system 10 consists of a BICUVOX electrolyte 12 placed in electrical contact with a pair of electrodes 14a and 14b. As shown in FIG. 1, upon applying voltage across this electrolyte/electrode assembly, or cell, oxygen molecules are first ionized at the cathode 14a/electrolyte 12 interface. The negatively charged oxygen ions, driven by the potential difference, then diffuse through BICUVOX electrolyte 12. At the opposite anode 14b/electrolyte 12 interface, oxygen molecules are reformed, generating pure oxygen. As indicated previously, the BICUVOX electrolyte 12 achieves satisfactory conductivity at temperatures below 600° C.

Preferably, BICUVOX electrolyte 12 is formed into a thin plate in order to enhance oxygen flux and reduce internal resistance. Preferably, BICUVOX electrolyte 12 is square in shape. The inventors used a ceramic tape-casting process to fabricate a BICUVOX electrolyte having the approximate dimensions of 5 cm (length) ×5 cm (width) ×0.02 cm (thickness). Electrodes 14a and 14b are composed of a material having similar thermal expansion behavior as BICUVOX. Preferably, electrodes 14a and 14b are composed of low cost machinable metal, such as Inconel®, a nickel-based alloy. Inconel® retains good physical integrity at elevated temperatures and provides support for the thin, brittle BICUVOX electrolyte which is "sandwiched" between two Inconel® electrodes. Preferably, electrodes 14a and 14b are formed into square plates having the same dimensions (length and width) as BICUVOX electrolyte 12. The inventors used Inconel® electrodes having approximate dimensions of 5 cm (length) ×5 cm (width) ×0.2 cm (thickness).

Electrodes 14a and 14b are preferably machined with cross-flow, V-shaped channels 16 and 18. As shown in FIG. 1, channels 16 are machined on that side of electrode 14a which is in contact with BICUVOX electrolyte 12. Similarly, channels 18, which are perpendicular to channels 16, are machined on that side of electrode 14b which is in contact with BICUVOX electrolyte 12. As illustrated in FIG. 1, channels 18 serve as flow channels for high purity oxygen gas whereas cross-flow channels 16 serve as flow channels for oxygen-depleted gas.

Preferably, a thin layer of gold paste (not shown) is applied to the BICUVOX electrolyte/electrode interface in order to reduce contact resistance. The inventors used a gold paste composed of gold powder and various organic ingredients. Gold powder may be purchased from the Degussa Corporation of Ridgefield Park, N.J.

Figure 2B:
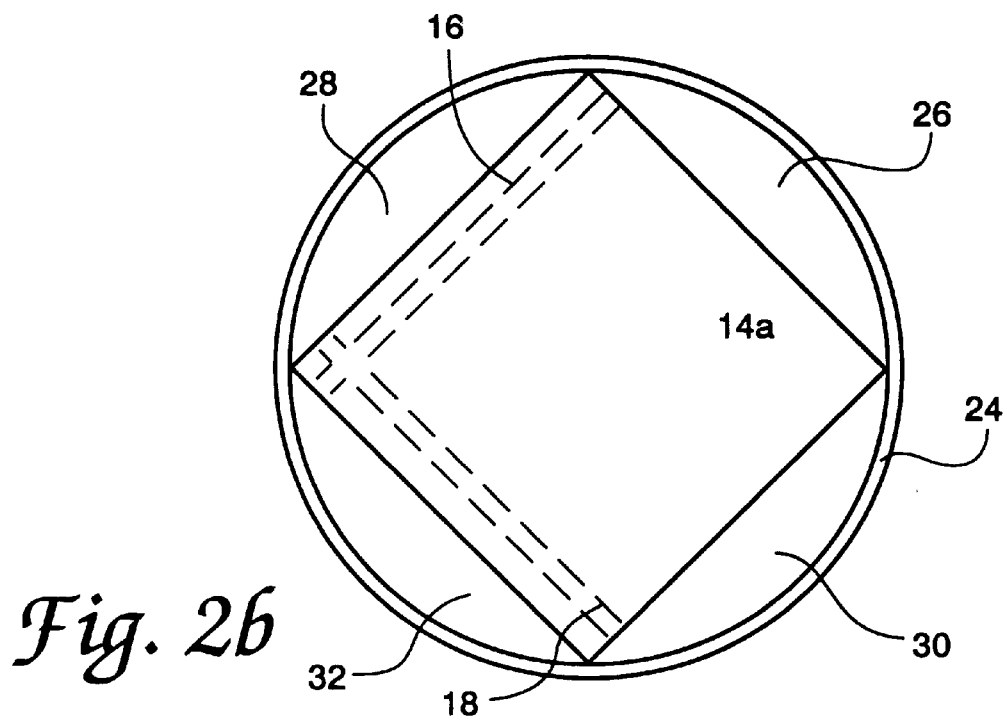
FIG. 2b is a top view of the stack of cells within the manifold.
Figure 2A:
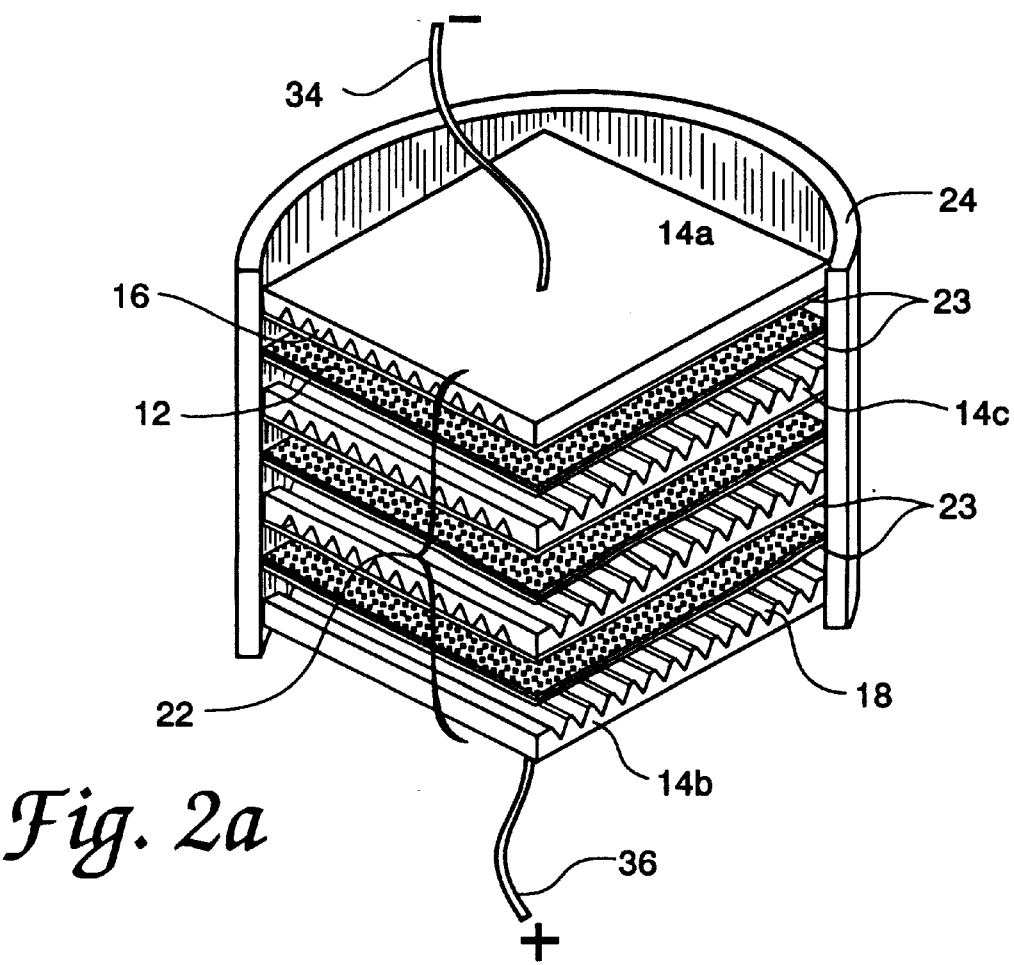
FIG. 2a is an exploded view of a stack of electrolyte/electrode cells enclosed within a tubular manifold.

An alternate embodiment of the invention is illustrated in FIG. 2a. The embodiment comprises a plurality of electrolyte/electrode cells arranged to form a stack of cells 22 of a desired height. In this configuration, stack 22 is equivalent to a number of cells arranged in series. As before, the electrodes are machined with cross-flow, V-shaped channels 16 and 18. As shown in FIG. 2a, top and bottom electrode plates 14a, 14b are machined with channels on one side only (that is, the side which is in contact with a BICUVOX electrolyte 12), whereas intermediate electrode plates 14c are machined with channels on both sides, as both sides are in contact with a BICUVOX electrolyte 12. Electrode plates 14a, 14b, 14c are oriented within stack 22 so as to separate oxygen and oxygen-depleted gas flows. As before, channels 18 serve as oxygen flow channels whereas cross-flow channels 16 serve as flow channels for oxygen-depleted gas. A thin layer of gold paste 23 is applied to each BICUVOX electrolyte/electrode interface.

As shown in FIG. 2a, electrolyte/electrode stack 22 is preferably enclosed in a tubular manifold 24. The diameter of manifold 24 is slightly larger than the length of the diagonal of the square electrolyte and electrode plates. Manifold 24 is composed of a material having similar thermal expansion behavior as BICUVOX. Preferably, manifold 24 is composed of magnesium oxide (MgO). The inventors used an MgO tube, manufactured by Ozark Technical Ceramics, Inc., having an outer diameter of 3 inches and inner diameter of 2¾ inches.

The four corners of stack 22 cell are sealed to the inside surface, or wall, of manifold 24 with ceramic cement, thereby creating four separate passages for gas flow within manifold 24. As illustrated in FIG. 2b, these passages 26, 28, 30, 32 are located between the ends of stack 22 and the inside wall of manifold 24. As shown in FIG. 2a, channels 16 extend between passages 26 and 32, whereas channels 18 extend between passages 28 and 30. It is therefore apparent that gas flowing through channels 16 may enter only passages 26 and 32, whereas gas flowing through channels 18 may flow only through passages 28 and 30.

Electrical connectors 34, 36 (e.g., wires, electrodes or probes) are connected to electrodes 14a and 14b. Connectors 34, 36 comprise an electric current supply circuit for creating a potential difference through the electrodes.

Figure 3:
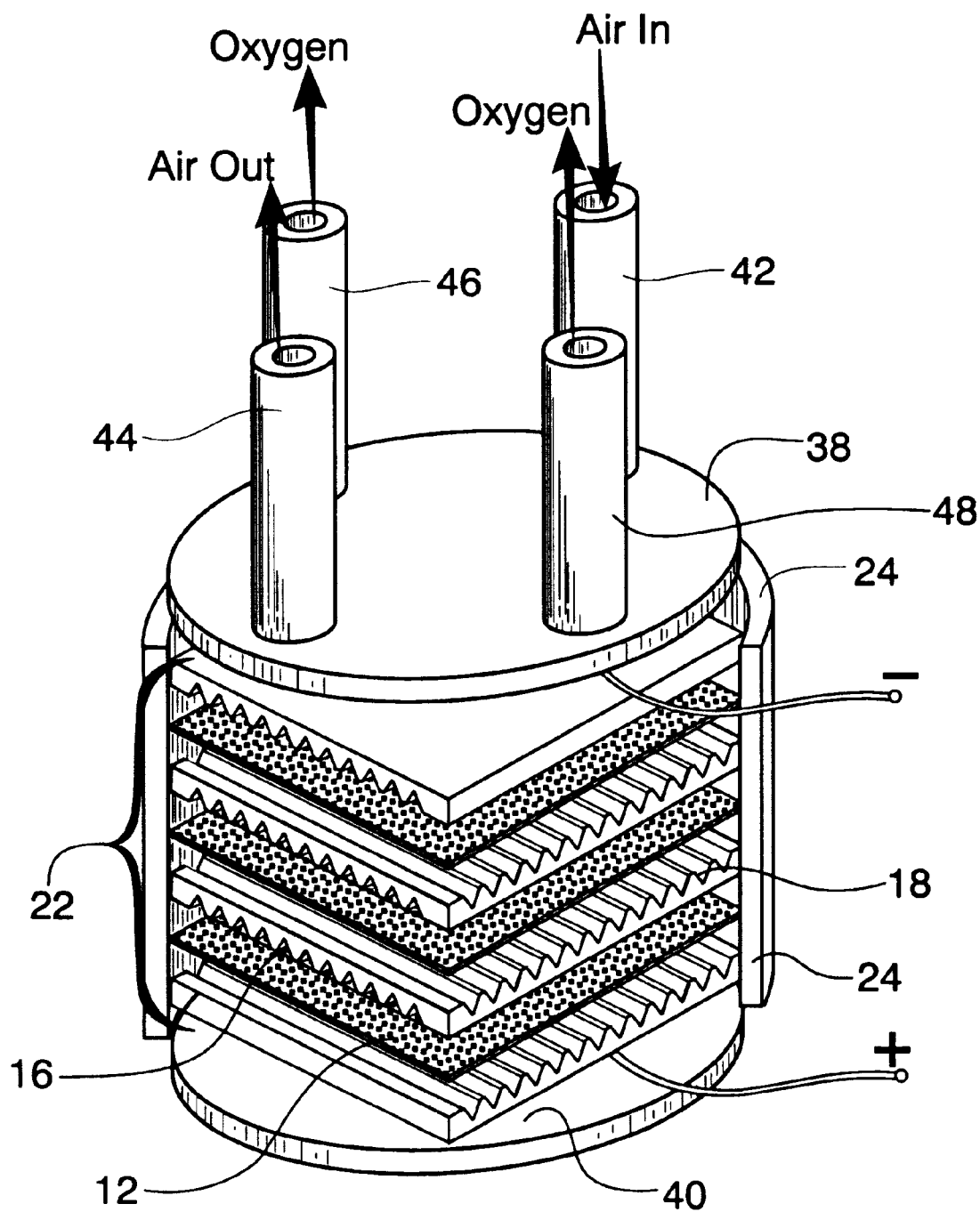
FIG. 3 illustrates a complete ceramic generating system using aspects of the invention.

After stack 22 is properly positioned within manifold 24 and electrical connectors 34, 36 are properly connected, two circular disks 38, 40 are used to cover the top and bottom, respectively, of manifold 24, as shown in FIG. 3. Preferably, disks 38, 40 are composed of magnesium oxide. Alternatively, disks 38, 40 may be composed of Inconel®.

Four stainless steel tubes 42, 44, 46, 48, each having an outer diameter of ¼ inch, are positioned within disk 38 to provide gas inflow and outflow for the system. As illustrated in FIG. 3, each tube is located over a gas passage. In particular, the inlet tube 42 for supplying oxygen-containing gas to the system is located over passage 26, whereas the outlet tube 44 for removing oxygen-depleted gas from the system, is located over passage 32, opposite from inlet tube 42. Oxygen outlet tube 46 is located over passage 28 and oxygen outlet tube 48 is located opposite tube 46, over passage 30.

Operation of the oxygen generation system illustrated in FIG. 3 will now be described. In operation, electrical (direct current) power is supplied to the system through lead wires 34, 36. As shown in FIG. 3, a source of oxygen-containing gas, such as ambient air, is supplied to the system through inlet tube 42. As air flows into passage 26, oxygen molecules are ionized at the cathode/electrolyte interface and reformed at the anode/electrolyte interface. High purity oxygen gas flows through channels 18 into passages 28 or 30 and is collected from oxygen outlet tubes 46 or 48, respectively. Meanwhile, oxygen-depleted gas flows through channels 16 into passage 32 and is released through outlet tube 44. As indicated previously, the BICUVOX electrolyte 12 achieves satisfactory conductivity at temperatures below 600° C.

In addition to the aforementioned benefits, this invention may also be suitable for other electrochemical applications, such as electrolysis of CO2 and solid-oxide fuel cells. The electrolysis of CO2 is a highly feasible technique for oxygen generation from a CO2-rich environment, and has been a focus of the NASA ISRU (In-Situ Resources Utilization) program. On the other hand, solid-oxide fuel cell technologies have long been developed for cleaner and more efficient generation of electricity. Currently, both the applications utilize a well-established stabilized zirconia system which needs to operate at temperatures as high as 1000° C. The target working temperature of the present invention is below 600° C., thereby providing a significant economic and technological benefit to various applications in which it may become incorporated.

The invention therefore provides a field usable novel apparatus and method for generating high-purity oxygen. It is understood that modifications to the invention may be made as might occur to one with skill in the field of the invention within the scope of the appended claims. All embodiments contemplated thereunder which achieve the objects of the invention have therefore not been shown in complete detail. Other embodiments may be developed without departing from the spirit of the invention or from the scope of the appended claims.

We claim:

1. A system for oxygen generation, comprising:
   (a) a plurality of cells arranged to form a stack of cells, each said cell comprising an electrolyte composed of BICUVOX having the formula $Bi_2V_{0.9}Cu_{0.1}O_{5.35}$, said electrolyte comprising a thin square plate, and a pair of electrodes placed in electrical contact with said BICUVOX electrolyte so as to produce a flow of oxygen ions therethrough, said electrodes comprising square plates having gas flow channels formed on each side in contact with said BICUVOX electrolyte plate, said channels being oriented such that oxygen flow and oxygen-depleted gas flow may be separated, said BICUVOX electrolytes and said electrodes have common lengths and widths; and
   (b) a tubular manifold enclosing said stack of cells wherein the diameter of said manifold is slightly larger than the common diagonal length of said plates and wherein said stack is sealed at its four corners to the inside surface of said manifold thereby creating between the sides of said cell and the inside surface of said manifold a first passage for oxygen-containing gas flow, a second passage for oxygen-depleted gas flow, and third and fourth passages for oxygen gas flow, said flow passages being separated from each other.

2. The system of claim 1 wherein said electrodes are composed of a nickel based alloy having similar thermal expansion behavior as BICUVOX.

3. The system of claim 1 wherein said manifold is composed of magnesium oxide.

4. The system of claim 1 further comprising a layer of gold paste between each said BICUVOX electrolyte plate and electrode plate.

5. The system of claim 1 further comprising an electrical current supply circuit for creating a potential difference between said electrodes.

6. The system of claim 1 further comprising a pair of circular disks for capping the top and bottom of said tubular manifold.

7. The system of claim 6 further comprising gas supply means connected to said top cap of said manifold over said first passage for supplying oxygen-containing gas to said system.

8. The system of claim 6 further comprising first and second gas receiving means connected to said top cap of said manifold over said third and fourth passages respectively for receiving oxygen gas from said system.

9. The system of claim 6 further comprising third gas receiving means connected to said top cap of said manifold over said second passage for receiving oxygen-depleted gas from said system.

* * * * *